United States Patent [19]
van Heiningen

[11] Patent Number: 5,738,758
[45] Date of Patent: Apr. 14, 1998

[54] PROCESS FOR THE CONVERSION OF CALCIUM SULFIDE

[75] Inventor: Adriaan R. P. van Heiningen, Mouth of Keswick, Canada

[73] Assignee: The University of New Brunswick, Fredericton, Canada

[21] Appl. No.: 577,978

[22] Filed: Dec. 22, 1995

[51] Int. Cl.$^6$ .................................................. D21C 11/12
[52] U.S. Cl. .................. 162/30.11; 162/35; 423/164; 423/560; 423/DIG. 3
[58] Field of Search ........................ 423/560, 164, 423/DIG. 3; 162/30.11, 35

[56] References Cited

U.S. PATENT DOCUMENTS

| | | |
|---|---|---|
| 3,867,251 | 2/1975 | Holme . |
| 4,321,242 | 3/1982 | Feinman et al. ............... 423/164 |
| 4,526,760 | 7/1985 | Empie, Jr. . |
| 4,536,253 | 8/1985 | Bertelsen . |
| 4,823,739 | 4/1989 | Marcellin . |
| 4,872,950 | 10/1989 | Andersson et al. . |
| 4,930,429 | 6/1990 | Ryham . |
| 4,969,930 | 11/1990 | Arpalahti . |
| 5,284,550 | 2/1994 | Tanca et al. . |
| 5,425,850 | 6/1995 | Tanca et al. . |

OTHER PUBLICATIONS

K. Salmenoja et al., "Development of Black Liquor Gasification", TAPPI Proceedings, 1993 Engineering Conference, pp. 969–975.

R. Backman et al., "Equilibrium behaviour of sodium, sulfur and chlorine in pressurized black liquor gasification with addition of titanium dioxide," Paper and Timber, vol. 76, No. 5, 1994, pp. 320–325.

R.E. Scott-Young et al., "Commercial Development of the DARS Process," 1995 International Chemical Recovery Conference, pp. B263–B267.

Primary Examiner—Neil McCarthy
Attorney, Agent, or Firm—Alix, Yale & Ristas, LLP

[57] ABSTRACT

The disclosure relates to a process for the removal of solid CaS from a gas stream in which the CaS has been formed and then the conversion of that solid CaS by reaction with an aqueous NaOH solution to produce solid $Ca(OH)_2$ and a liquor stream containing dissolved NaHS. This removal and conversion process is described as being used in conjunction with a process for gasifying black liquor from a kraft pulping process in which $H_2S$ is scrubbed from the gases using calcium compounds to form the CaS.

1 Claim, 2 Drawing Sheets

PROCESS FOR THE CONVERSION OF CALCIUM SULFIDE

BACKGROUND OF THE INVENTION

This invention relates to a process for the removal of solid calcium sulfide from a gas stream in which said CaS has been formed and the conversion of the removed CaS to recover the sulfur in the form of sodium compounds. The invention is particularly applicable to the processing of a gas stream containing reduced sulfur compounds such as $H_2S$ and COS and will be described in that context but the invention is not limited to that particular application.

The kraft pulping process employs an alkaline pulping liquor, known as white liquor, to react with the lignins in the wood and free the fibrous portions. Following a series of filtering and washing steps, the fibrous portion is separated as raw pulp and the remaining spent cooking liquor, which is dark in color, is known as weak black liquor. This liquor, which is approximately 85% water, is then subjected to a series of various types of evaporation to produce strong black liquor with a solids content greater than 50%. The strong black liquor is then ready for the chemical recover phase.

The typical prior art process for treating black liquor to recover chemicals employs what is commonly referred to as a chemical recovery furnace. In these furnaces, which are operated as boilers for the generation of steam, the strong black liquor is fired to burn the organic content and to form a smelt composed primarily of sodium sulfide and sodium carbonate. This smelt is drained from the smelt bed in the bottom of the furnace, dissolved in water to form green liquor and then causticized to form the white pulping liquor containing sodium sulfide and sodium hydroxide.

U.S. Pat. No. 5,284,550 entitled "Black Liquor Gasification Process Operating At Low Pressure Using A Circulating Fluidized Bed," which issued Feb. 8, 1994 and U.S. Pat. No. 5,425,850 entitled "CFB Black Liquor Gasification System Operating At Low Pressures," which issued Jun. 20, 1995, describe and claim one such system and process for replacing a chemical recovery furnace. Referring to the subject matter of U.S. Pat. Nos. 5,284,550 and 5,425,850, they basically involve the replacement of the typical chemical recovery furnace with a black liquor gasification system using a circulating fluidized bed reactor arrangement including the arrangement for processing the gases and solids which are produced to generate fresh cooking liquor. In the processes disclosed in these prior patents, kraft black liquor is gasified under substoichiometric conditions to form a product gas rich in sulfide, primarily $H_2S$ with some COS, and a solid bottoms product containing primarily $Na_2CO_3$ along with some unreacted $Na_2SO_4$ and some $Na_2S$. The bottoms product is dissolved to form what is referred to as green liquor which is then reacted to convert the $Na_2CO_3$ to NaOH. This is done by a causticizing process where slaked lime, $Ca(OH)_2$, is added to convert the $Na_2CO_3$ to NaOH and $CaCO_3$. The solid $CaCO_3$ is then calcined in a kiln to convert it to CaO which is then slaked and recycled to the causticizer.

As an alternative, what is referred to as an autocausticizing process can be employed as disclosed and claimed in one or more patent applications being filed concurrently with this application. That process involves the use of a metal oxide, preferably titanium dioxide in the form of the complex $Na_2O \cdot 3TiO_2$ with make-up $TiO_2$, to react with the sodium salts in the gasifier to form sodium titanate, $4Na_2O \cdot 5TiO_2$, and $CO_2$. The solid $4Na_2O \cdot 5TiO_2$ from the gasifier is hydrolyzed to form NaOH for the white liquor and $Na_2O \cdot 3TiO_2$ for recycle to the gasifier. This eliminates the separate causticizing operation.

Whether an autocausticizing process or the conventional separate causticizing process is employed for handling the solids, a process must be provided for recovering the sulfur from the product gas. A conventional way of removing the $H_2S$ and COS from the product gases is by scrubbing with a liquor stream containing NaOH and $Na_2CO_3$. The problem with such a wet scrubbing operation for $H_2S$ and COS removal is that the system also absorbs $CO_2$ from the gas. This $CO_2$ absorption consumes NaOH in the scrubbing medium with a resultant increased load on the lime kiln and causticizing system. A process which selectively absorbs the sulfur with little or no absorption of $CO_2$ would be very beneficial to the overall chemical recovery process.

SUMMARY OF THE INVENTION

The present invention relates to a process for the removal of solid CaS from a gas stream and then the conversion of the removed CaS to recover the sulfur in the form of sodium compounds and the calcium as $Ca(OH)_2$. The CaS is reacted with an aqueous NaOH solution to produce precipitated $Ca(OH)_2$ and a liquor stream containing dissolved NaHS.

DESCRIPTION OF THE PREFERRED EMBODIMENT

Figure 1:
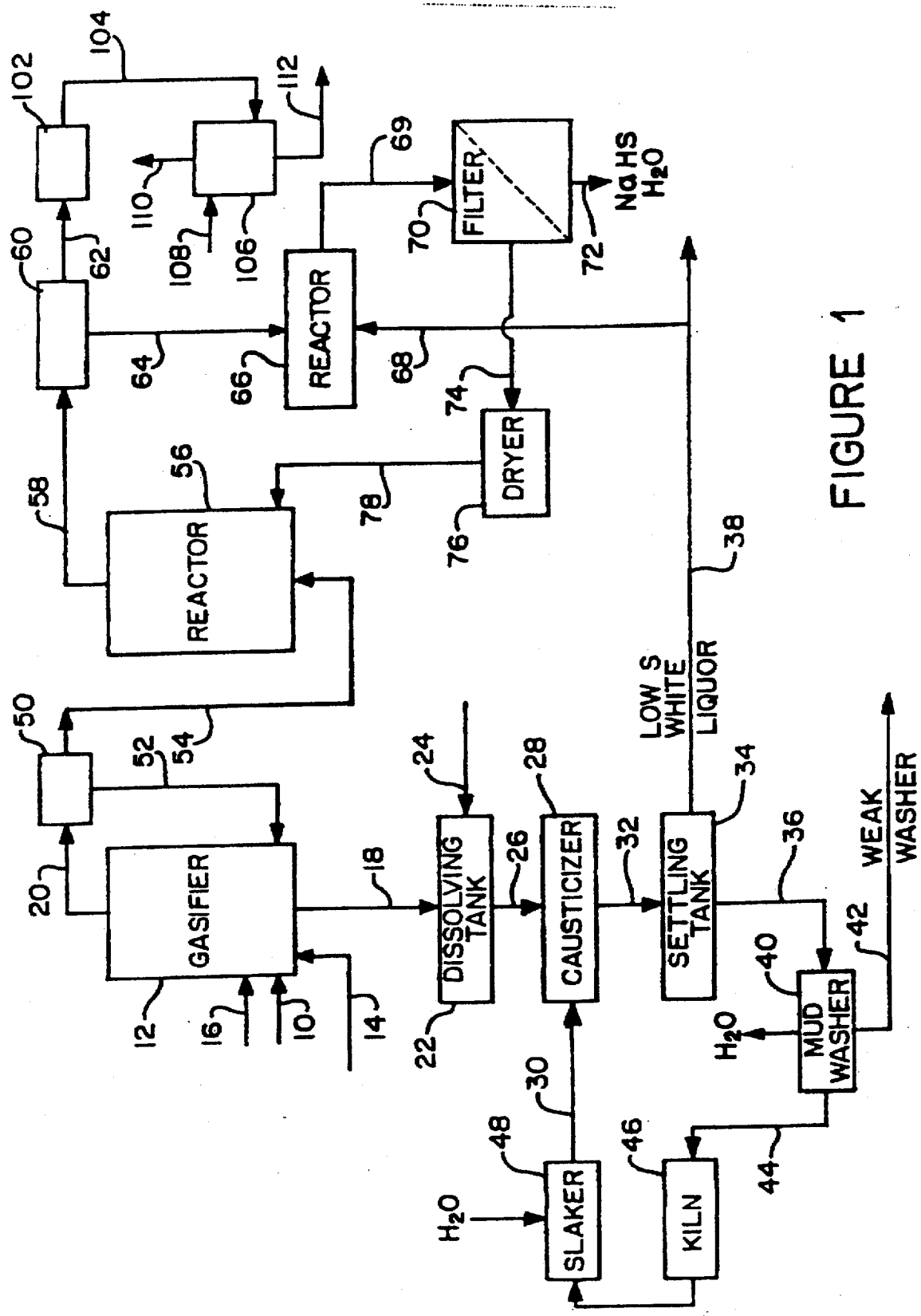
FIG. 1 is a process flow diagram of a black liquor gasification system incorporating the present invention.

FIG. 1 is a representation of the process flow diagram for a black liquor gasification system as described in the previously mentioned prior U.S. Pat. Nos. 5,284,550 and 5,425,850. Strong black liquor 10 derived from the pulp digestion process is fed to the circulating fluidized bed gasifier 12. Fluidizing air 14 and reaction air 16 are also fed into the gasifier 12 all as explained by the two prior patents previously identified. The gasification process is carried out with substoichiometric oxygen levels and the primary net reactions with respect to sodium and sulfur which occur in the gasifier are as follows:

$Na_2SO_4 + 4C \rightarrow Na_2S + 4CO$ $Na_2SO_4 + 4CO \rightarrow Na_2S + 4CO_2$ $Na_2S + H_2O + CO_2 \rightarrow Na_2CO_3 + H_2S$ $Na_2SO_4 + 4H_2 \rightarrow Na_2S + 4H_2O$ $S + H_2 \rightarrow H_2S$ $2Na + C + 3/2O_2 \rightarrow Na_2CO_3$ $2Na + S \rightarrow Na_2S$ The total air to the gasifier is generally in the range of 20% to 50% of stoichiometric which results in the gasification of more than 60% and up to 99% of the sulfur contained in the black liquor. The remaining sulfur reacts with sodium to form $Na_2S$ which remains a solid and is discharged out the bottom along with the $Na_2CO_3$ and any unreacted $Na_2SO_4$. The solids which are formed, primarily $Na_2CO_3$, are collected and drained from the bottom of the gasifier as bottoms solids stream 18 while the gas product 20 is removed from the top of the gasifier 12. The gas stream 20 contains sulfur, primarily as $H_2S$, in addition to the other products of the substoichiometric oxidation process, namely $CO_2$, CO, $H_2$, $H_2O$, $CH_4$ and $N_2$.

The bottoms stream 18 from the gasifier 12, which is a solids stream containing primarily $Na_2CO_3$ but with some small amount of $Na_2S$, is fed to the dissolving tank 22. The sodium solids are dissolved in a liquid stream 24 which may be water or a weak liquor or scrubber liquor stream to form green liquor. The resulting green liquor stream 26 contains more than 70% and up to 95% sodium as sodium carbonate on a mole basis.

The green liquor stream 26 is fed to the causticizer 28 where slaked lime, $Ca(OH)_2$, is added from line 30 to convert the $Na_2CO_3$ to NaOH and $CaCO_3$. The slurry 32 from the causticizer 28 is fed to the settling tank 34 where the solids, primarily $CaCO_3$, are separated out as a sludge 36 leaving the low sulfide white liquor stream 38. The $CaCO_3$ sludge 36 is washed with water in the mud washer 40 leaving a weak wash stream 42 which can be used in the plant, as needed. The washed $CaCO_3$ 44 is fed to the kiln 46 for calcining to CaO and then to the slaker 48 for conversion back to $Ca(OH)_2$. The white liquor stream 38 is composed mainly of NaOH with small amounts of $Na_2S$ and is recycled to the digester.

The gas product 20 from the gasifier 12 would first be cleaned of entrained particulate material at 50 by some form of mechanical separator such as a cyclone with the removed solids being recycled at 52 back to the gasifier. If any additional fine dust removal is needed, the gas would then be sent through an electrostatic precipitator, bag filter or some other form of dust removal equipment (not shown). For further details of the mechanical separation and dust removal, see the previously mentioned prior U.S. Pat. Nos. 5,284,550 and 5,425,850.

The cleaned gas product stream 54 is fed to the sulfur recovery reactor 56 which is a dry scrubber preferably of the circulating fluidized bed type. In the reactor 56, there is a circulating fluidized bed of solid particulate CaO, $CaCO_3$ or $Ca(OH)_2$ which is calcined (dehydrated) at 580° C. to CaO. The CaO or $CaCO_3$ reacts with the $H_2S$ and COS as follows:

$CaCO_3 + H_2S \rightarrow CaS + H_2O + CO_2$ $CaO + H_2S \rightarrow CaS + H_2O$ $Ca(OH)_2 + H_2S \rightarrow CaS + 2H_2O$ $CaCO_3 + COS \rightarrow CaS + 2CO_2$ $CaO + COS \rightarrow CaS + CO_2$ $Ca(OH)_2 + COS \rightarrow CaS + CO_2 + H_2O$ The CaO and $CaCO_3$ react with the $H_2S$ to form mostly CaS above about 650° C. and at 750° C. more than 99% of the $H_2S$ is converted to CaS. Therefore, the reactor 56 is maintained at a temperature of at least 650° C. and preferably about 750° C. Higher temperatures could be used but at much above 750° C., the conversion tends to drop off very slightly, so there would be no particular incentive to operate at any higher temperature. At higher pressures, CaO reacts with $CO_2$ as well as $H_2S$ to form $CaCO_3$ which can be mitigated to some extent by increasing the reaction temperature.

The effluent 58 from the reactor 56 contains calcium solids mostly as CaS plus unreacted CaO and $CaCO_3$. The solids plus the remaining gaseous products, CO, $CO_2$, $H_2$, $H_2O$, $CH_4$ and $N_2$ are introduced to the separator 60, preferably a cyclone separator similar to separator 50, where the solids are removed. The remaining gas 62 normally has sufficient heating value so it would be burned in combustion equipment such as a steam generator before discharge to the atmosphere as will be more fully explained hereinafter.

The solids 64 from the separator 60, containing primarily CaS plus whatever unreacted CaO and $CaCO_3$ might be present, are fed to the reactor 66 which, for example, might be a continuous stirred tank reactor. Also fed to the reactor 66 is an aqueous solution 68 of NaOH. This NaOH solution may be from the NaOH-rich white liquor stream 38 as illustrated, but it could be from any desired source. The NaOH reacts with the CaS as follows:

$CaS + NaOH + H_2O \rightarrow Ca(OH)_2 + NaHS$

Also, any unreacted CaO hydrolyses to form $Ca(OH)_2$. There is close to 100% conversion of CaS into NaHS using NaOH when the contact time is about 4 hours and the temperature is 90° C. or higher. The $Ca(OH)_2$ precipitates out leaving an aqueous solution of NaHS. The solid calcium compounds consisting of $Ca(OH)_2$ and $CaCO_3$ are separated from the slurry 69 at 70 which may be a filter as illustrated or a centrifuge or any other suitable solid/liquid separator. The solution 72 of NaHS from the filter 70 is a high sulfide white liquor stream which is then recycled to the pulp digestion process either directly or after blending as desired with the low sulfide white liquor stream 38. The solid calcium compounds 74 from the filter 70 are dried at 76 and then fed in line 78 back into the circulating fluidized bed reactor 56.

Figure 2:
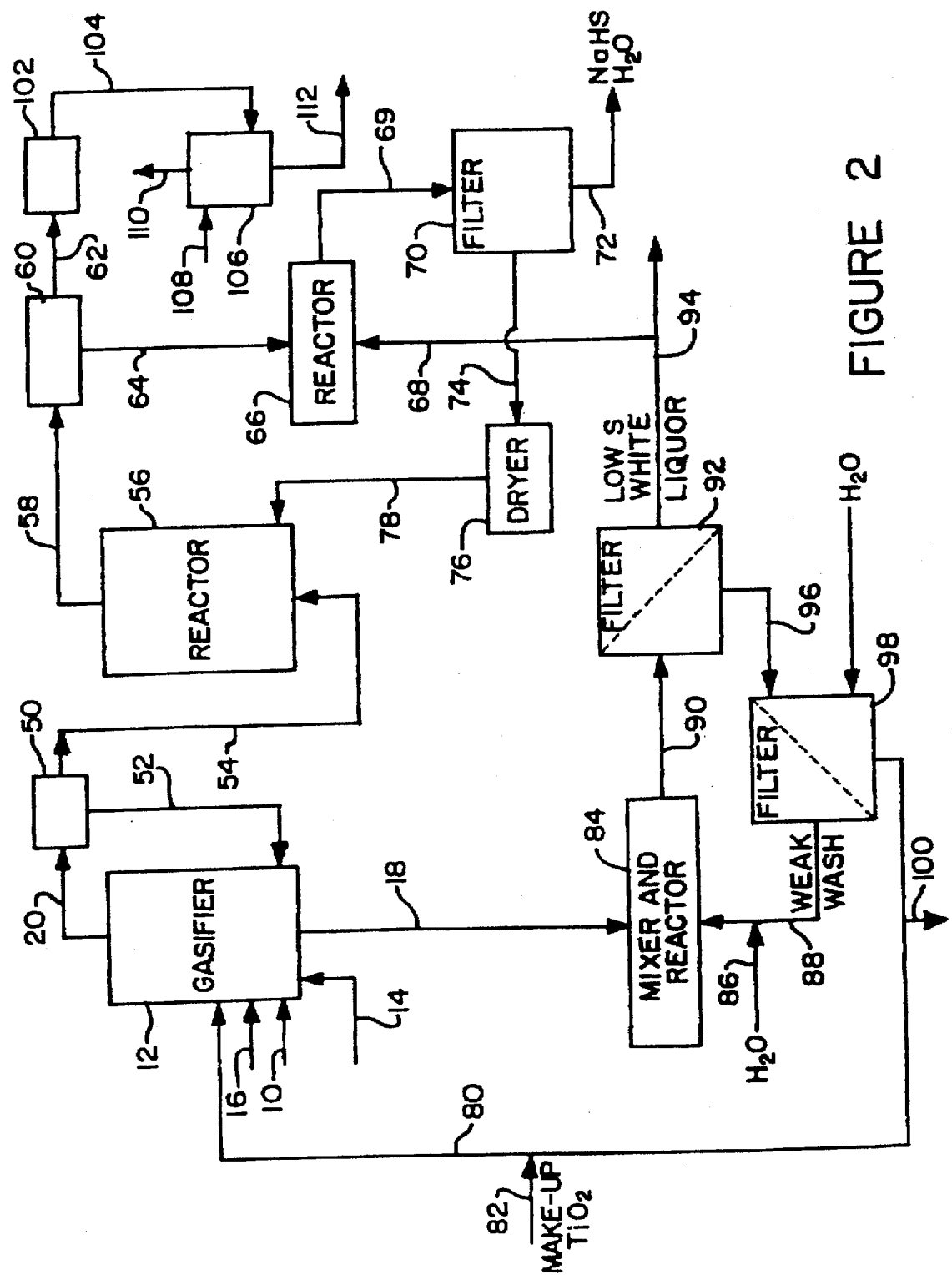
FIG. 2 is a process flow diagram illustrating a modified black liquor gasification system also incorporating the present invention.

FIG. 2 illustrates the present invention as it would be applied using the concept of direct causticization. The same basic arrangement of a circulating fluidized bed gasifier 12 fed with black liquor 10 and fluidizing and combustion air 14 and 16 is used. A similar overhead gas stream 20 is produced and the solids are separated at 50 and recycled back to the gasifier at 52. This line 52 would actually comprise a conventional solids return system consisting of a discharge duct from the bottom of the separator 50 and a fluidization seal system, known as a G valve or a seal pot. This is to assure one way flow of solids from the separator 50 back to the gasifier.

The operation of the gasifier in FIG. 2 differs from the gasifiers shown in FIG. 1, in that titanium compounds are introduced into the gasifier at 80. The titanium compounds in line 80 comprise recycled sodium titanate, $Na_2O \cdot 3TiO_2$, and make up titanium dioxide, $TiO_2$, added as needed at 82. The source of the recycle $Na_2O \cdot 3TiO_2$ will be apparent from the further description. In the gasifier, the titanium dioxide and sodium titanate react as follows:

$4Na_2CO_3 + 5TiO_2 \rightarrow 4Na_2O \cdot 5TiO_2 + 4CO_2$ $7Na_2CO_3 + 5(Na_2O \cdot 3TiO_2) \rightarrow 3(4Na_2O \cdot 5TiO_2) + 7CO_2$ The $CO_2$ which is formed exits with the gas from the top of the gasifier while any of the solid sodium/titanium compounds which are circulated in the gas stream 20 are separated at 50 and returned to the gasifier 12. Ultimately, the solid sodium/titanium compounds exit out of the bottom of the gasifier at 18. As can be seen, the solid product from the gasifier now contains little or no $Na_2CO_3$.

The gasifier must be operated in a temperature range where the solids do not melt and agglomerate. Some solid compounds formed in the normal course of black liquor pyrolysis, such as certain sodium and potassium salts, tend to melt at temperatures as low as 500° C. to 600° C. However, with the circulating solids made up predominantly of the sodium/titanium compounds, the gasifier can be operated at higher temperatures, in the range of 650° C. to 950° C. The presence of the dry, high melting point sodium/titanium compounds will counter the agglomerating effect that the melting of other solids would have on the fluidization characteristics. First, the dry sodium/titanium compounds will bind to and coat any melted compounds so that they will not agglomerate. Second, there will be a dilution of any melted compounds by the dry sodium/titanium compounds, so that any agglomeration will be insignificant and will not cause the collapse of the fluidized bed. The advantage of being able to operate the gasifier at a higher temperature is that the reactions involved will proceed at a higher rate. Also, the autocausticizing reactions require the higher temperatures and the presence of the titanium compounds permits these higher temperatures.

The solids stream 18 from the gasifier is fed to the mixing/reaction vessel 84. Water, either as make-up water 86 or the weak wash stream 88, is added to the mixer/reactor 84 where it reacts with the solids as follows:

$$2(4Na_2O \cdot 5TiO_2) + 7H_2O \rightarrow 14NaOH + 5(Na_2O \cdot 3TiO_2)$$

The effluent 90 from the mixer/reactor 84 is a slurry of the solid $Na_2O \cdot 3TiO_2$ in the solution of NaOH and small amounts of unreacted $Na_2S$. This effluent 90 fed to the solids separation device 92 which, for example, may be a filter or centrifuge. The liquid is removed at 94 as a low sulfide white liquor stream for recycle to the digester. The solids discharge 96 from the separator 92 is washed with water at 98 with the resulting weak wash liquor 88 being used for slurrying with the gasifier bottoms or for other possible uses in the plant. The solids from the washer 98 comprising primarily $Na_2O \cdot 3TiO_2$ are then recycled to the gasifier in line 80. Because various solids referred to as non-process elements (NPE's) which do not participate in the pyrolysis or chemical recovery, such as ash and sand, may accumulate over a period of time in the circulating solids, a side stream 100 of the solids return stream 80 may be purged to remove them from the system. Just as indicated earlier with respect to FIG. 1, the cleaned gas stream 54 is reacted at 56 with NaOH to recover sulfur and produce a high sulfide white liquor stream 72 of NaHS in accordance with the present invention. Although the use of CaO, $CaCO_3$ and $Ca(OH)_2$ has been described as the reactants for $H_2S$ in the gas, calcined dolomite, $CaMgO_3$, could also be used.

As indicated earlier, the remaining gas stream 62 has a heating value and is burned in combustion equipment. As shown in both FIGS. 1 and 2, this gas stream 62 is fed to the combustion equipment 102 which, for example, could be a steam generator or a lime kiln. Any $H_2S$ and COS which have not been reacted in the reactor 56 will be oxidized to $SO_2$ in the combustion equipment. The flue gas stream 104 containing the $SO_2$ is scrubbed at 106 with a scrubbing solution 108, such as a NaOH solution, which will convert the $SO_2$ to $Na_2SO_3$ and $Na_2SO_4$. The reactions which take place in the $SO_2$ scrubber 106 are as follows:

$$SO_2 + Na_2SO_3 + H_2O \rightarrow 2NaHSO_3$$
$$NaHSO_3 + NaOH \rightarrow Na_2SO_3 + H_2O$$
$$2Na_2SO_3 + O_2 \rightarrow 2Na_2SO_4$$

The inclusion of this scrubber 106 reduces the total sulfur emissions from the plant in the flue gas 110 and recovers sulfur for use in the process. The liquor 112 from the scrubber 106 containing both sulfite and sulfate is then returned to the pulping process.

Although the conversion of the CaS to NaHS has been described thus far as involving the reaction with NaOH, the CaS can also be reacted with $Na_2CO_3$ according to the following reaction:

$$Na_2CO_3 + 2CaS + 2H_2O \rightarrow CaCO_3 + 2NaHS + Ca(OH)_2$$

This conversion produces precipitates of both $CaCO_3$ and $Ca(OH)_2$. Therefore, it requires the calcination of the $CaCO_3$ in a lime kiln to yield CaO for recycle back to the dry scrubber. This type of conversion might be an interest when there is already an existing kiln, i.e., when direct causticization is not involved.

I claim:

1. A process for the conversion of solid CaS in a gas stream to a liquor stream containing sodium sulfide compounds comprising the steps of:
   a. separating said solid CaS from said gas stream;
   b. reacting said separated solid CaS with an aqueous solution of sodium compounds selected from the group consisting of NaOH and $Na_2CO_3$ whereby solid $Ca(OH)_2$ and dissolved NaHS are formed; and
   c. separating said solid $Ca(OH)_2$ from said dissolved NaHS thereby forming said liquor stream containing NaHS.

* * * * *